(12) United States Patent
Nakayama

(10) Patent No.: US 9,575,239 B2
(45) Date of Patent: *Feb. 21, 2017

(54) SPREAD ILLUMINATING APPARATUS

(71) Applicant: MINEBEA CO., LTD., Kitasaku-gun, Nagano (JP)

(72) Inventor: Daisuke Nakayama, Fukuroi (JP)

(73) Assignee: MINEBEA CO., LTD., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,292

(22) Filed: Apr. 6, 2015

(65) Prior Publication Data
US 2015/0309243 A1   Oct. 29, 2015

(30) Foreign Application Priority Data
Apr. 28, 2014   (JP) ................................ 2014-092897

(51) Int. Cl.
F21V 8/00   (2006.01)

(52) U.S. Cl.
CPC ............. *G02B 6/0068* (2013.01); *G02B 6/002* (2013.01); *G02B 6/0016* (2013.01)

(58) Field of Classification Search
CPC ..... G02B 6/002; G02B 6/0013; G02B 6/0051; G02B 6/0068; G02F 1/133606
See application file for complete search history.

(56) References Cited

U.S. PATENT DOCUMENTS 5,359,691 A * 10/1994 Tai ..................... G02B 6/0036
362/561
7,520,652 B2 * 4/2009 Yamashita ........... G02B 6/0013
362/608

FOREIGN PATENT DOCUMENTS

JP   2013-026138 A   2/2013

* cited by examiner

*Primary Examiner* — Karabi Guharay
(74) *Attorney, Agent, or Firm* — Oliff PLC

(57) ABSTRACT

Light that enters from an incident light surface of a light guide plate includes not only light which is guided toward the forward direction in front but also light whose optical path is modified by optical elements while progressing through the inside of the light guide plate, and thus wasteful emission from an emitting surface is inhibited. Lights are guided in a longitudinal direction of the optical elements. Light is diffused in the course over which the lights are guided and the region to which they are guided. The lights are guided by the optical elements in the longitudinal direction of the optical elements, and thereby light diffusivity is exhibited in the region in which the optical elements are provided while controlling the directivity of the light.

10 Claims, 8 Drawing Sheets

F I G. 1A
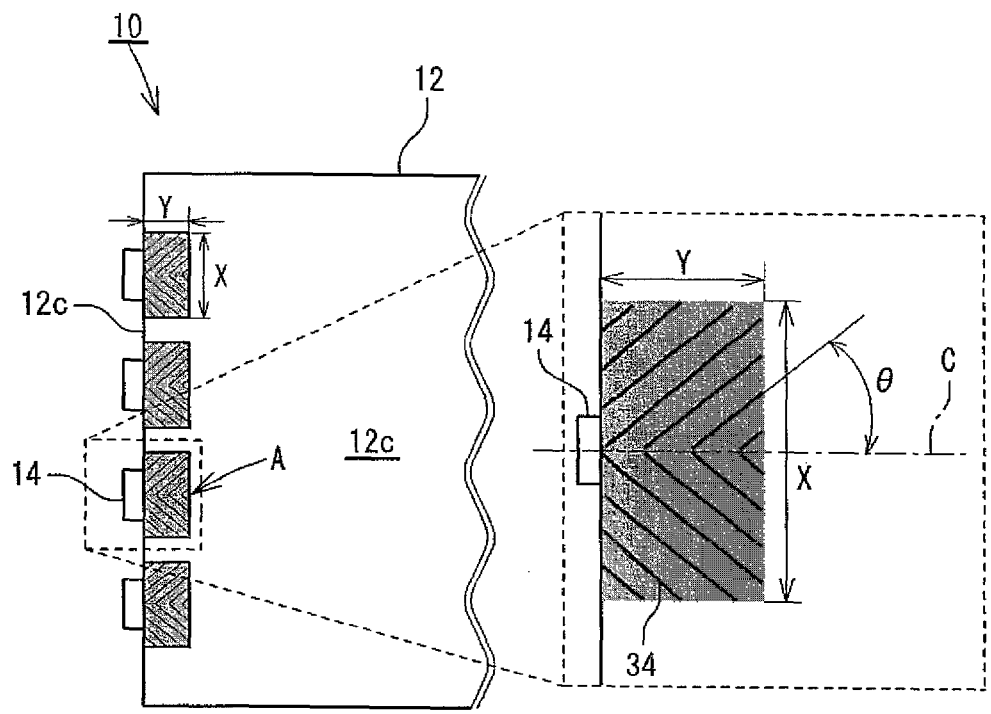
F I G. 1B
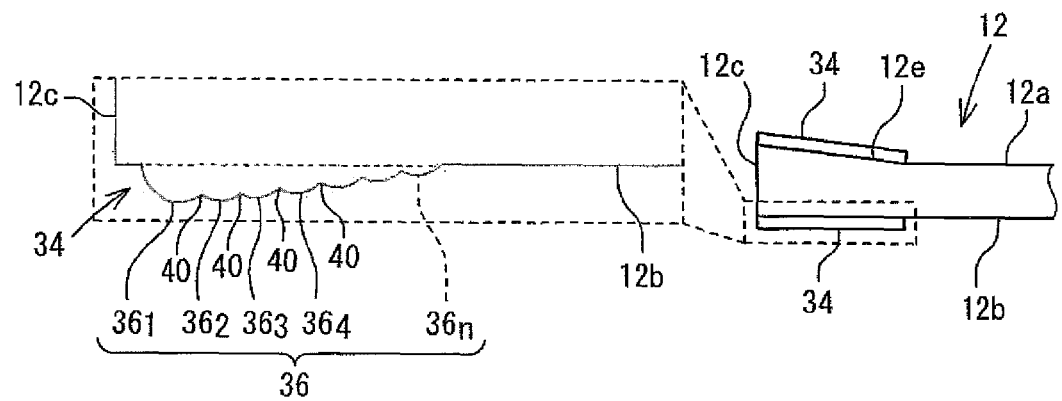

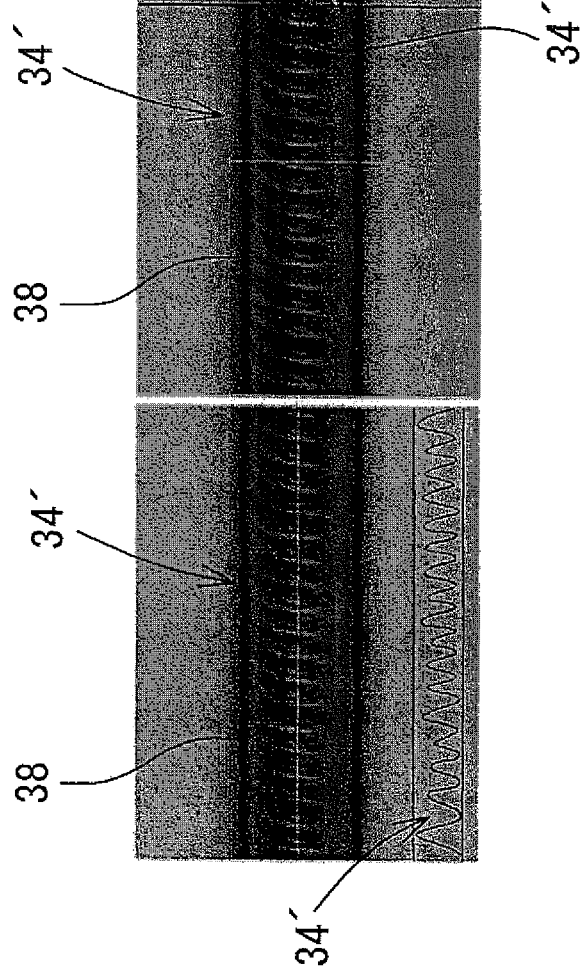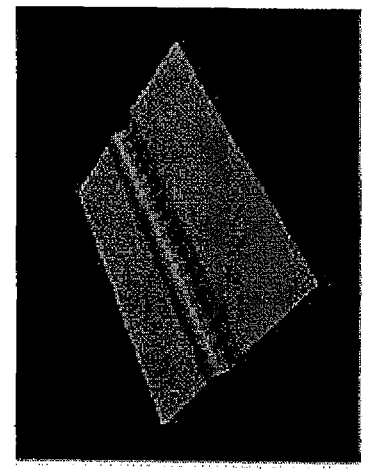

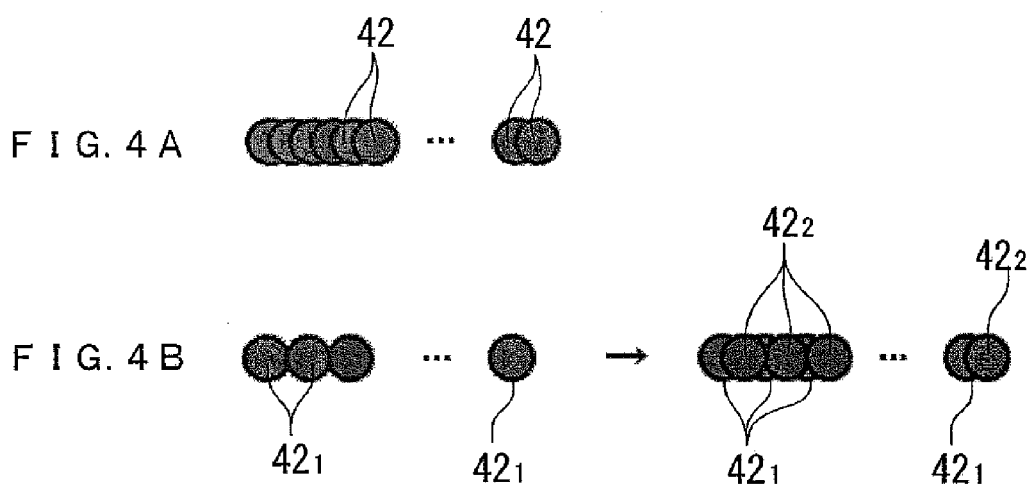

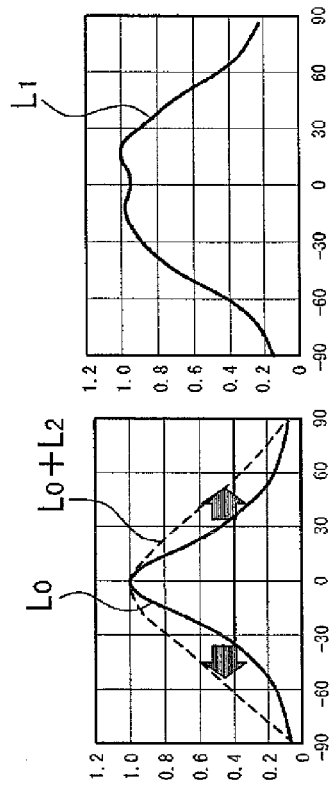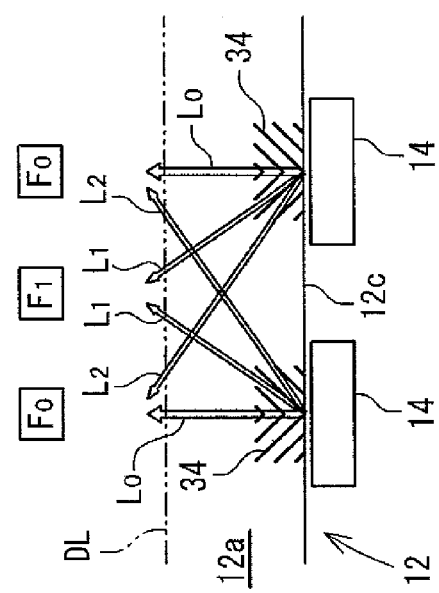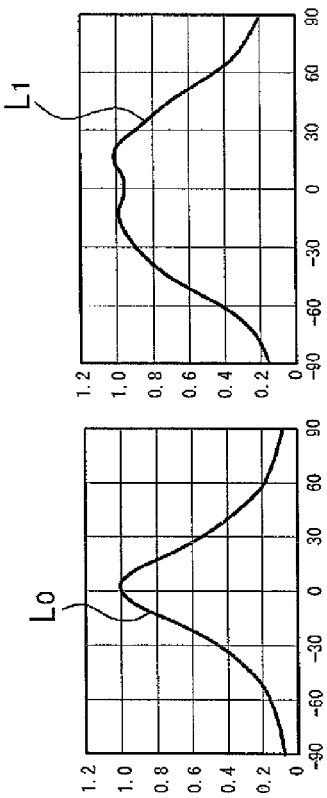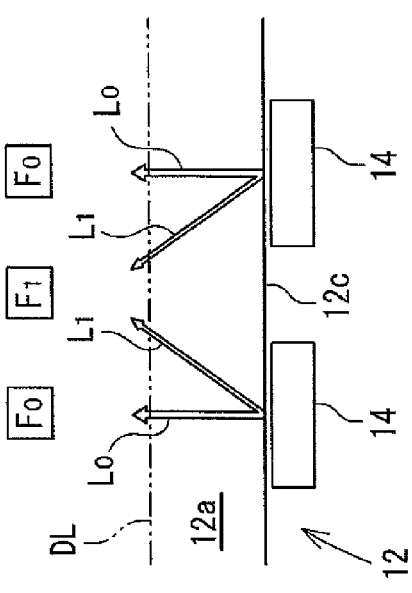

SPREAD ILLUMINATING APPARATUS

BACKGROUND OF THE INVENTION

1. Field of the Invention

The present invention relates to a spread illuminating apparatus used as an illumination unit of a liquid crystal display device or the like.

2. Description of the Related Art

Liquid crystal display devices are now regularly used as display devices of electronic apparatuses such as personal computers and mobile telephones. Liquid crystal is not a self-luminous display element, and thus an illumination unit for irradiating light onto the liquid crystal panel is required. As such an illumination unit for a liquid crystal display device, a spread illuminating apparatus including a light guide plate and a light source disposed to the side of the light guide plate as the main constituent elements is widely used in combination with a liquid crystal display device because such a spread illuminating apparatus has an advantage of being easy to make thin. Further, due to recent enhancements in the performance of white light-emitting diodes (LEDs), spread illuminating apparatuses utilizing white LEDs as a light source are now common in order to achieve further reductions in the size, thickness, and power consumption of spread illuminating apparatuses.

An example of such a spread illuminating apparatus will now be explained while referring to the constitution (FIG. 9) of a spread illuminating apparatus 10 according to an embodiment of the present invention to be explained later.

The spread illuminating apparatus 10 has a basic constitution in which a light guide plate 12 and LEDs 14 disposed opposing an incident light surface 12c of the light guide plate 12 are accommodated in a housing frame 16. Since the LEDs 14 are point light sources, when light emitted from the LEDs 14 enters into the light guide plate 12 from the incident light surface 12c, there are cases in which brightness unevenness referred to as brightness spots or hot spots may occur. Such brightness unevenness may impair the uniformity of the brightness at a light emitting surface 12a, which is one of the principal surfaces of the light guide plate 12. Therefore, the occurrence of such brightness unevenness must constantly be suppressed in order to secure high quality visibility of the object to be illuminated such as a liquid crystal display device or the like. Thus, technology for preventing the occurrence of brightness unevenness is being developed (for example, refer to Japanese Patent Application Laid-Open (JP-A) No. 2013-26138).

SUMMARY OF THE INVENTION

Incidentally, cases have also been confirmed in which brightness unevenness that occurs near the incident light surface 12c may or may not be visible depending on the direction in which the emitting surface 12a of the light guide plate 12 is viewed. Specifically, brightness unevenness is not visible when viewing the emitting surface 12a of the light guide plate 12 from directly above (a front view), but brightness unevenness is visible when viewing the emitting surface 12a from a diagonal direction along the incident light surface 12c (in the following explanation, this will be referred to as a "diagonal view").

The present invention was created in consideration of the above-described problems, and an object thereof is to reduce brightness unevenness when diagonally viewing a spread illuminating apparatus.

The embodiments of the invention described below are examples of the structure of the present invention. In order to facilitate the understanding of the various structures of the present invention, the explanations below are divided into aspects. Each aspect does not limit the technical scope of the present invention, and the technical scope of the present invention can also include structures in which a portion of the components in the aspects below is substituted or deleted, or another component is added upon referring to the best modes for carrying out the invention.

According to a first aspect of the present invention, a spread illuminating apparatus includes: a plurality of light sources, and a light guide plate including an incident light surface at which the plurality of light sources are disposed and a principal surface adjacent to the incident light surface, wherein a plurality of optical elements formed linearly are provided in a predetermined region of the principal surface of the light guide plate adjacent to the incident light surface, each of the plurality of optical elements has a concave/convex shaped part in which concave parts and/or convex parts are repeatedly aligned in a longitudinal direction of the optical elements, and the plurality of optical elements are disposed so as to extend from the front of the plurality of light sources toward the forward direction in front of an adjacent light source(s).

With this structure, the spread illuminating apparatus includes a plurality of optical elements formed linearly in a predetermined region of the principal surface of the light guide plate adjacent to the incident light surface. Each of the optical elements has a concave/convex shaped part, in which three-dimensional concave parts and/or convex parts are repeatedly aligned in the longitudinal direction of the optical elements. Therefore, an optical path of light that enters from the incident light surface of the light guide plate is modified by the concave/convex shaped parts that constitute the optical elements while the light is progressing through the inside of the light guide plate, and thus the light is guided toward the longitudinal direction of the optical elements. Furthermore, in the course over which the light is guided and the region to which the light is guided, the light is suitably diffused in a state in which wasteful emission from the emitting surface is inhibited. In other words, each of the optical elements guides the light in the longitudinal direction of the optical elements, and thereby suitable diffusivity is also exhibited in the region in which the optical elements are provided while controlling the directivity of the light.

In addition, the optical elements are disposed to extend forward from the front of each of the plurality of light sources toward the front of an adjacent light source(s). Thereby, light emitted from one of the light sources is guided while being suitably diffused toward the front direction of the adjacent light source(s). Also, the recessed amount and/or protruding amount of the concave/convex shaped parts that constitute the optical elements are not constant, and thus the optical path of light progressing through the inside of the light guide plate is modified randomly. Therefore, a diffusing effect of light which is diffused toward the front direction of the adjacent light source(s) is efficiently exhibited. Further, by providing a plurality of optical elements, the above-described effects are achieved by each of the plurality of optical elements.

The concave/convex shaped parts are not limited to an embodiment in which concave parts and/or convex parts are regularly repeated in the longitudinal direction of the optical elements. For example, the concave parts and/or convex parts can be repeated non-periodically or irregularly, such as by making the height (depth) or pitch of each concave part and/or convex part unequal. The concave/convex shaped parts also include a case in which the concave/convex shapes are not clearly concave or convex and relative differences in height occur irregularly, and a case in which microscopic concavities or convexities are superimposed on macroscopic concave/convex shapes.

In addition, the optical elements are not limited to those formed by only concave/convex shaped parts, and include optical elements in which concave/convex shaped parts are formed in a portion of the width-direction (short-dimensional direction) (for example, the center in the width direction) of the linearly-formed optical elements.

Moreover, the predetermined region of the principal surface of the light guide plate adjacent to the incident light surface in which the plurality of optical elements are formed can be a band-shaped (rectangular) region in a plan view of the principal surface of the light guide plate, or a region over a fixed range in the forward direction in front of the light sources (for example, a range of an arbitrary shape such as a rain drop shape, a fan shape, a trapezoid shape, and the like in a plan view) in consideration of the light distribution of light emitted from the light sources, the light distribution of light emitted from the emitting surface of the light guide plate, and the like.

Further, according to the first aspect of the invention, the plurality of optical elements include optical elements that are formed linearly.

With this structure, wasteful emission from the emitting surface of light that has entered from the incident light surface of the light guide plate is inhibited by the linearly-formed optical elements while the light is progressing through the inside of the light guide plate, and the light is guided in the longitudinal direction of the optical elements which extend linearly, and thereby the above-described effects are achieved.

Further, according to the first aspect of the invention, the plurality of optical elements that are formed linearly are parallel to each other.

With this structure, the plurality of optical elements which are formed linearly are parallel to each other. Thereby, the directivity of light that is guided by each of the optical elements is aligned in one direction, and the directivity of the light is effectively controlled.

Further, according to the first aspect of the invention, the plurality of optical elements are disposed such that an average value of angles formed by the plurality of optical elements with a perpendicular direction relative to the incident light surface of the light guide plate is 30° or more but less than 60°.

With this structure, the average value of the angles formed by the plurality of optical elements with the perpendicular direction relative to the incident light surface of the light guide plate, i.e. the optical axis of the light source, is 30° or more but less than 60°, and thereby the above-described effects are appropriately exhibited.

Further, according to the first aspect of the invention, the plurality of optical elements include optical elements having one endpoint thereof disposed on an optical axis of the light source.

With this structure, the plurality of optical elements include optical elements having one endpoint thereof disposed on the optical axis of the light source, and thereby the above-described effects are appropriately exhibited.

Further, according to the first aspect of the invention, the spread illuminating apparatus includes optical elements that extend in mutually opposite directions in a plan view of the principal surface.

With this structure, the spread illuminating apparatus includes optical elements that extend in mutually opposite directions in a plan view of the principal surface, and thereby light emitted from one light source is diffused toward the front direction of the light sources adjacent on both sides to the one light source, and thus the above-described effects are achieved.

Further, according to the first aspect of the invention, the spread illuminating apparatus includes optical elements that extend in mutually opposite directions in a plan view of the principal surface, wherein on the optical axis of the light source, endpoints of the optical elements that extend in mutually opposite directions are arranged alternately along the optical axis of the light source.

With this structure, the endpoints of optical elements that extend in mutually opposite directions at the axis of the light source in a plan view of the principal surface are arranged alternately along the optical axis of the light source. Thereby, when diffused toward the front direction of the light sources that are adjacent on both sides to the one light source, light emitted from the one light source is efficiently and uniformly diffused toward the front direction of the light sources that are adjacent on both sides.

Compared to a case in which the endpoints of the optical elements match on the optical axis of the light source, the concave parts and/or the convex parts that constitute the optical elements do not overlap and thus the shape of the optical elements can be easily controlled.

Further, according to the first aspect of the invention, the plurality of optical elements are disposed such that adjacent concave parts or convex parts partially overlap each other in a plan view of the principal surface.

With this structure, each concave/convex shaped part is arranged such that adjacent concave parts and/or convex parts partially overlap each other in a plan view of the principal surface. Thereby, compared to a concave/convex shaped part in which adjacent concave parts or convex parts are formed to be arranged discretely, the inclination angle of the three-dimensional shape that constitutes the concave/convex shaped part can be appropriately set. In other words, if each concave part or convex part is constituted by a three-dimensional curved surface whose inclination angle changes regularly such as a dome shape, the inclination angle of the three-dimensional curved surface increases approaching the outer edge parts. On the other hand, if adjacent concave parts or convex parts are arranged to partially overlap each other, the outer edge parts of the three-dimensional curved surface that constitutes each concave part or convex part are clipped off by adjacent concave parts or convex parts such that they become linearly aligned. Since the outer edge parts which have a large inclination angle are clipped off, the effect of modifying the optical path of light that progresses through the inside of the light guide plate is reduced, which allows for an increase in the amount of light that progresses farther from the incident light surface. Therefore, the amount of light emitted from regions of the principal surface of the light guide plate that are farther from the incident light surface increases, and thus the light diffusing effect is efficiently achieved. Further, the amount of light emitted from dead areas is suppressed, and thus the efficiency of light utilization is improved.

Further, according to the first aspect of the invention, an outer diameter-to-pitch ratio of the concave parts and/or convex parts is 2 or more but less than 50.

With this structure, the ratio of the outer diameter (the width in the short-dimensional direction of the optical elements) to the pitch (the pitch of adjacent concave parts and/or convex parts in the longitudinal direction of the optical elements) of the concave parts and/or convex parts is 2 or more but less than 50. Thereby, the effect of controlling the directivity of light by the optical elements and the effect of suitable diffusion are appropriately exhibited.

Further, according to the first aspect of the invention, the concave parts and/or convex parts that constitute each concave/convex shaped part form a dome shape.

With this structure, the concave parts and/or convex parts that constitute each concave/convex shaped part are dome-shaped, and a plurality of the concave parts and/or convex parts are continuously formed to be linear overall. Thereby, the above-described effects are appropriately exhibited.

Further, according to the first aspect of the invention, a contact angle of the plurality of optical elements relative to the principal surface is 30° or more but less than 50°.

With this structure, the contact angle of the plurality of optical elements relative to the principal surface is 30° or more but less than 50°, and thereby the above-described effects are appropriately exhibited.

Further, according to the first aspect of the invention, an arc-shaped part is included in a cross-section of each concave/convex shaped part along the longitudinal direction of the optical element.

Further, according to the first aspect of the invention, a ridge line extending to connect one end side in the short-dimensional direction of the optical element to the other end side in an arc shape is included in each concave/convex shaped part in a plan view of the principal surface.

Further, according to the first aspect of the invention, the optical elements are formed such that the protruding amount and/or recessed amount of the concave/convex shaped parts decreases as the distance from the incident light surface increases.

The optical elements do not need to be formed in a straight line, and can be, for example, curved or undulating in consideration of the necessary light distribution characteristics and optical characteristics (in accordance with the embodiment of the brightness unevenness). By forming optical elements constituted so as to present various trajectories such that the protruding amount and/or recessed amount of the concave/convex shaped parts decreases as the distance from the incident light surface increases, an effect in which the visibility of bright lines is avoided is achieved.

With the structures described above, brightness unevenness can be reduced when diagonally viewing a spread illuminating apparatus.

BRIEF DESCRIPTION OF DRAWINGS

FIG. 1 schematically illustrates a light guide plate of a spread illuminating apparatus according to an embodiment of the present invention, wherein FIG. 1A shows a plan view and an essential part enlarged view of the plan view, and FIG. 1B shows a side surface view and an essential part enlarged view of the side surface view;

FIG. 2 illustrates grooves of a die for forming optical elements of a light guide plate of the spread illuminating apparatus according to the embodiment of the present invention, wherein FIG. 2A is a plan view and a longitudinal direction cross-section view (concave/convex profile of a width direction center portion) of the grooves, FIG. 2B is a plan view and a short-dimensional direction cross-section view of the grooves, and FIG. 2C is a perspective view of the grooves shown in FIGS. 2A and 2B;

FIG. 3 is an explanatory view of a method for manufacturing the light guide plate according to the embodiment of the present invention, wherein

FIG. 4 illustrates an example of a method for forming concave parts that are linear overall by irradiating a laser in a region of the molding surface of the die corresponding to the optical elements, wherein FIG. 4A illustrates an example in which simple constant pitch processing is carried out in a single groove processing step, and FIG. 4B illustrates an example in which a first groove processing step is carried out at a feeding pitch that is higher than that of the example in FIG. 4A and then a second groove processing step is carried out to form concave parts at intermediate positions between the concave parts formed in the first groove processing step;

FIG. 5 explains the effects achieved by the optical elements of the light guide plate according to the embodiment of the present invention, wherein

FIG. 6 illustrates examples of the optical elements of the light guide plate shown in FIG. 1, wherein

FIG. 7 explains the effects achieved by the optical elements of the light guide plate according to the embodiment of the present invention, wherein FIG. 7A schematically illustrates an effect of modifying an optical path of the optical elements according to the embodiment of the present invention, FIG. 7B shows graphs illustrating the light distribution at a point $F_0$ and a point $F_1$ in FIG. 7A, and FIGS. 7C and 7D illustrate views corresponding to FIGS. 7A and 7B of a light guide plate that does not include optical elements as a comparative example of FIGS. 7A and 7B;

DETAILED DESCRIPTION

Figure 3A:
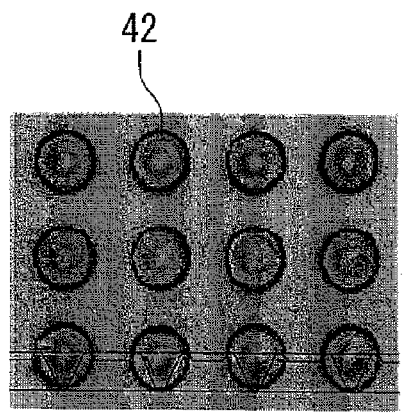
FIG. 3A is a plan view illustrating concave parts that are discretely formed on a molding surface of a die for convenience.

A spread illuminating apparatus according to an embodiment of the present invention will be explained below referring to the drawings. Portions which are identical to or correspond to those explained above in the related art will be appropriately assigned the same reference numeral and detailed explanations thereof will be omitted.

In the following explanations, the front direction of the LEDs 14 which are point light sources, or in other words the direction from the incident light surface 12c of the light guide plate 12 toward an end surface 12d that opposes the incident light surface 12c, will be referred to as the "forward direction".

Figure 9:
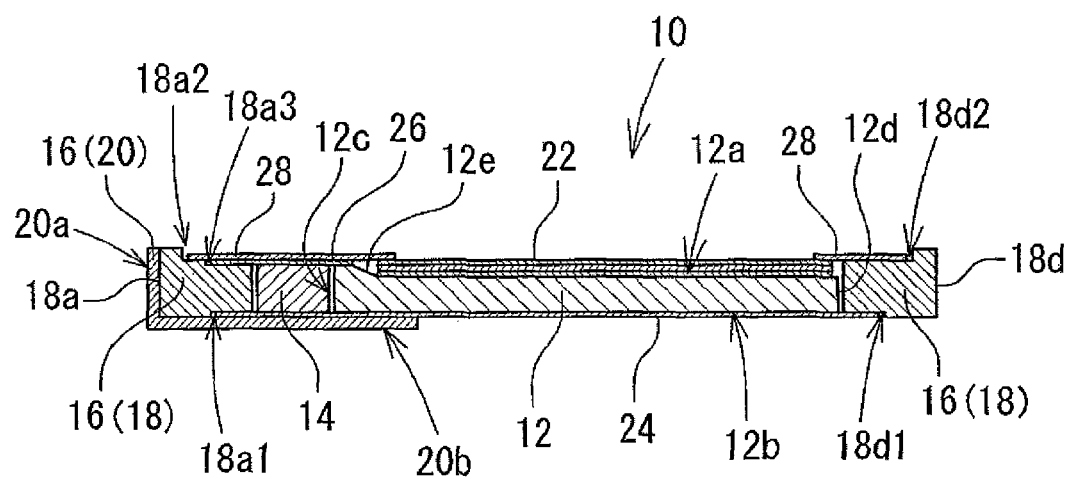
FIG. 9 is a cross-section view schematically illustrating a spread illuminating apparatus according to the embodiment of the present invention.

The spread illuminating apparatus 10 according to an embodiment of the present invention shown in FIG. 9 includes a light guide plate 12 in which one principal surface 12a (top surface) of a pair of opposing principal surfaces 12a and 12b is a light emitting surface, LEDs 14 that serve as point light sources and are disposed opposing an incident light surface 12c of the light guide plate, and a housing frame 16 for accommodating these constituent elements. The light guide plate 12 is made by molding a transparent resin material such as a polycarbonate resin. As the LEDs 14, for example, a white LED of a structure in which a blue light-emitting LED chip is sealed with a translucent resin obtained by mixing yttrium aluminum garnet (YAG) fine particles activated with cerium, which are yellow light-emitting phosphors, into a hardened silicone resin is used. The housing frame 16 includes a frame-shaped resin frame 18 that surrounds the light guide plate 12 and is made of a synthetic resin, and a metal frame 20 that is disposed on the outside of the resin frame 18. For the metal frame 20, for example, a sheet metal frame of, for example, stainless steel which has high rigidity and light reflectance is used. However, the metal frame 20 is not limited to such a sheet metal frame as long as equivalent characteristics can be obtained. There are also cases in which the metal frame 20 is not used.

An optical sheet 22 is disposed on the light emitting surface 12a side of the light guide plate 12. In the illustrated example, the optical sheet 22 is obtained by stacking three sheets, each having appropriate optical characteristics, on each other. Also, the light guide plate 12 is formed such that the thickness between the opposing principal surfaces 12a and 12b relative to the incident light surface 12c is decreased by at least the thickness of the optical sheet 22. In the example of FIG. 9, a region (wedge part) 12e in which the thickness of the light guide plate tapers moving away from the incident light surface 12c side is provided between a portion of the light guide plate adjacent to the incident light surface 12c and a portion of the light guide plate in which the principal surfaces 12a and 12b oppose each other, wherein these portions have different thicknesses. Further, a reflective sheet 24 is disposed on the underside surface 12b side of the light guide plate 12. A frame-shaped light blocking sheet 28 is disposed on the light emitting surface 12a of the light guide plate 12 so as to retain the outer periphery of the optical sheet 22. In a plan view of the light guide plate 12 from the light emitting surface 12a side, a portion concealed by the frame-shaped light blocking sheet 28 is a non-luminous area (i.e. a dead area).

Step parts 18a1 and 18d1 for positioning the reflective sheet 24 and step parts 18a2 and 18d2 for positioning the light blocking sheet 28 are formed on one side edge part 18a at which the LEDs 14 are disposed and another side edge part 18d which opposes the side edge part 18a of the frame-shaped resin frame 18. Further, on the one side edge part 18a, a step part 18a3 for positioning an FPC 26 on which the LEDs 14 are mounted is formed.

In addition, in the light guide plate 12 according to this embodiment of the present invention, a plurality of optical elements 34 are provided in predetermined regions A adjacent to the incident light surface 12c of at least one (both surfaces in the example of FIG. 1) of the principal surfaces 12a and 12b. In the example of FIG. 1, each predetermined region A forms a rectangular shape of a length X and a depth Y toward the forward direction from the incident light surface 12c centered on an optical axis C of the LED 14.

Also, the optical elements 34 according to the example shown in FIG. 1 are formed as protrusions which are linear overall. Further, in the illustrated example, the optical elements 34 are formed such that the protruding amount from the principal surfaces 12a and 12b gradually decreases as the distance from the incident light surface 12c increases as shown in FIG. 1B. Each predetermined region A adjacent to the incident light surface 12c is, for example, set to be a non-luminous area (a so-called dead area) that is concealed by the frame-shaped light blocking sheet 28 when viewing the light guide plate 12 in a plan view from the light emitting surface 12a side. Also, if the wedge part 12e is provided as shown in FIG. 1B, for example, each predetermined region A can be set to approximately correspond to the region of the wedge part 12e.

The plurality of optical elements 34 provided in each predetermined region A adjacent to the incident light surface 12c are disposed to extend from the front of each LED 14 toward the forward direction in front of the adjacent LED(s) 14. In the example of FIG. 1, the plurality of optical elements 34 are formed linearly and parallel to each other in a plan view of the principal surfaces 12a and 12b. Further, the plurality of optical elements 34 are disposed such that the average value of θ formed by the plurality of optical elements 34 with the perpendicular direction relative to the incident light surface 12c of the light guide plate 12, i.e. the optical axis C of the LED, is 30° or more but less than 60°. Also, (some of) the plurality of optical elements 34 are formed such that one endpoint thereof is disposed on the optical axis C of the LED 14 and the optical elements 34 extend in mutually opposite directions in a plan view of the principal surfaces 12a and 12b.

Figure 3B:
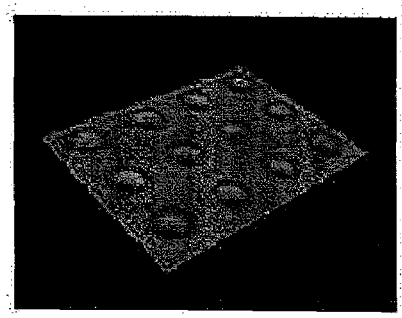
FIG. 3B is a perspective view of FIG. 3A.

As shown in FIG. 1B, the optical elements 34 according to this embodiment of the present invention include concave/convex shaped parts 36 which are formed to be linear overall by repeatedly aligning concave parts and/or convex parts in the longitudinal direction of the optical elements. In the illustrated example, the concave/convex shaped parts 36 that constitute the optical elements 34 are formed by repeatedly aligning a plurality of convex parts $36_1$ to $36_n$ in the longitudinal direction of the optical elements 34. In the following embodiment, these convex parts $36_1$ to $36_n$ form a convex dome shape transferred by dome-shaped concave parts 42 formed on a die as shown in FIGS. 3A and 3B. However, the concave parts 42 may have a configuration which is not the dome-shape, so that each of the convex parts $36_1$ to $36_n$ is allowed to have a configuration not the dome-shape according to the non-domed configuration of the concave parts 42.

The concave/convex shaped parts 36 are constituted as a continuous body by arranging adjacent convex parts $36_1$ to $36_n$ so that they partially overlap each other in a plan view of the principal surfaces 12a and 12b of the light guide plate 12.

Figure 3C:
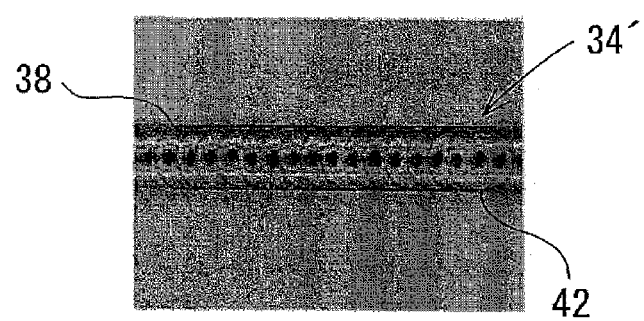
FIG. 3C is a plan view schematically illustrating the stripe-shaped grooves corresponding to the optical elements and a state in which concave parts that are adjacent during processing partially overlap each other in a plan view of the molding surface of the die.

Thus, an arc-shaped part obtained by cutting the convex parts $36_1$ to $36_n$ of FIG. 1B is included in the cross-section of the concave/convex shaped parts 36 along the longitudinal direction of the optical elements 34. Further, ridge lines 40 (if ridge lines 38 as shown in FIGS. 2 and 3C are formed in the die, the ridge lines 40 are transferred by these ridge lines 38) extending to connect one end side in the short-dimensional direction of the optical elements 34 to the other end side in an arc shape are formed in the concave/convex shaped parts 36 of the optical elements 34 in a plan view of the principal surfaces 12a and 12b of the light guide plate 12.

Next, a method for manufacturing the light guide plate 12 according to this embodiment of the present invention will be explained below.

Basically, in the method for manufacturing the light guide plate 12 including the optical elements 34, an operation for forming concave parts and/or convex parts is carried out at a predetermined feeding pitch (which does not need to be constant) so that the concave parts and/or convex parts partially overlap each other in a region of the light guide plate 12 in which the optical elements 34 are to be provided, thereby forming a plurality of the optical elements 34. For example, the use of a die in the manufacture of the light guide plate 12 enables mass production of the light guide plate 12 including the optical elements 34 with high precision and at low cost.

In this case, in the die producing step, the example illustrated in FIG. 4A consists of forming the concave parts 42 by simple constant pitch processing in a single groove processing step. Alternatively, the example illustrated in FIG. 4B consists of forming concave parts $42_1$ in a first groove processing step carried out at a feeding pitch that is higher than that of the example in FIG. 4A and then forming concave parts $42_2$ in a second groove processing step at intermediate positions between the concave parts $42_1$ formed in the first groove processing step.

In the processing methods of FIGS. 4A and 4B, even if the pitch of the concave parts 42 that are ultimately formed is the same, the concave/convex structure of the grooves formed in the die will be different. However, the processing method is preferably selected appropriately considering the necessary optical characteristics.

In this embodiment of the present invention, a laser is used in the groove processing step(s). The following explanation is based on the example shown in FIG. 4A. In the operation for forming the concave parts in the die producing step, one concave part 42 is formed by irradiating a laser beam, and then the next concave part 42 is formed by shifting the irradiating position of the laser beam by a predetermined distance (a distance that is less than the dimensions of width, length, diameter, etc. of a single concave part 42). When forming each concave part 42, the concave part 42 is formed with a necessary depth by irradiating the laser beam for a predetermined number of shots. The next concave part 42 is formed so that it partially overlaps the concave part 42 which has already been formed. In this case, the most recently formed concave part 42 will have a different shape than the concave parts 42 formed previously, and the most recently formed concave part 42 will be larger than the concave parts 42 formed previously (until a steady state is reached).

Further, an operation in which the position at which the laser beam is to be irradiated is, for example, shifted by the same distance in the same direction to form the next concave part 42 is repeated. Thereby, the plurality of concave parts 42 partially overlap each other, and the concave/convex shaped parts whose recessed amount and/or protruding amount are not constant in both the short-dimensional direction and the longitudinal direction become continuous, such that the grooves 34' are formed to be linear overall.

In this case, the recessed amount of the concave parts 42 can be adjusted by the number of irradiation shots of the laser beam (specifically, the depth of each concave part 42 increases as the number of irradiation shots of the laser beam increases). Thus, the plurality of concave parts 42 can be formed such that the recessed amount thereof gradually decreases as the distance from the position corresponding to the incident light surface increases.

Also, if a laser is used in the groove processing step(s), the shape of each concave part 42 is formed such that a convex outer ring is formed at the outer edge of the concave part 42 due to the influence of heat during laser irradiation or the like, as can be seen in the cross-section shape indicated by lines in FIGS. 3A and 3B. Regardless of whether it is intentional, these complex concave/convex shapes in which microscopic convex shapes (or concave shapes) overlap with each other contribute to the operational effects of the present invention as will be explained later.

As a specific example of the dimensions of the grooves 34' for forming the optical elements 34 that are constituted by the concave parts 42 of the die, for example, the grooves 34' are provided linearly with a length of 4 mm at a pitch of 110 μm to be parallel to each other in a direction away from the incident light surface 12c of the light guide plate 12. The width (dimension in the short-dimensional direction) of each groove 34' is 55 μm, the height is 5 μm, and the pitch of the concave part 42 is 10 μm. The pitch is preferably ½ or less (more preferably ⅓ or less) of the dimension in the short-dimensional direction of the grooves 34'. Further, the concave/convex height difference is preferably greater than 0 and 1 μm or less. However, the present invention is not limited to the above-described dimensions.

The ratio of the outer diameter (the width in the short-dimensional direction of the optical elements) to the pitch (the pitch of adjacent concave parts 42 in the longitudinal direction which are transferred as optical elements 34) of the concave parts 42 of the die is preferably 2 or more but less than 50. The contact angle of the optical elements 34, which are constituted when the grooves 34' are transferred, relative to the principal surfaces 12a and 12b, is preferably formed to be 30° or more but less than 50°.

As a laser processing machine to be used for the laser processing, for example, a YAG laser, a $YVO_4$ laser, a fiber laser with a fiber-shaped medium, and the like is used. With regard to the wavelength of the laser beam, it is, for example, 1.06 μm or the like. However, the present invention is not limited to such solid lasers or the above wavelength, and a gas laser such as a $CO_2$ laser, a semiconductor laser, a liquid laser, and the like can also be used.

Figure 6A:
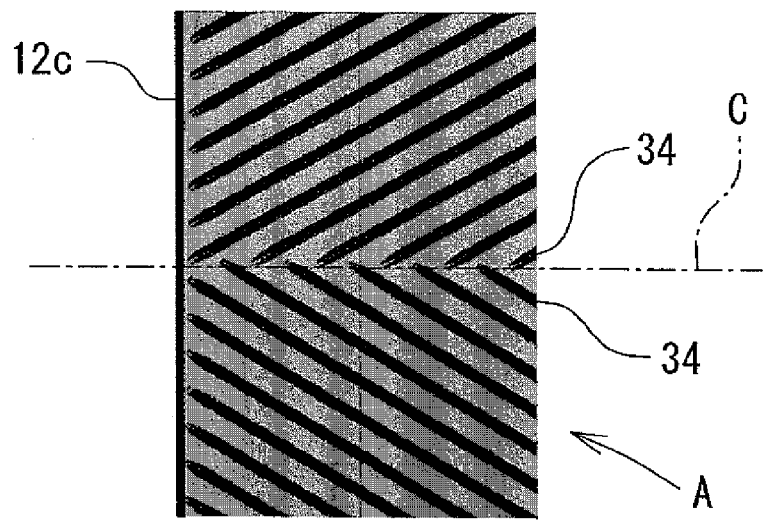
FIG. 6A is an enlarged plan view of one embodiment of the optical elements.

FIG. 6 illustrates different placement embodiments of the optical elements 34. In the example shown in FIG. 6A, on the optical axis C of the LED 14, endpoints of the optical elements 34 that extend in mutually opposite directions are arranged alternately along the optical axis C.

Figure 6B:
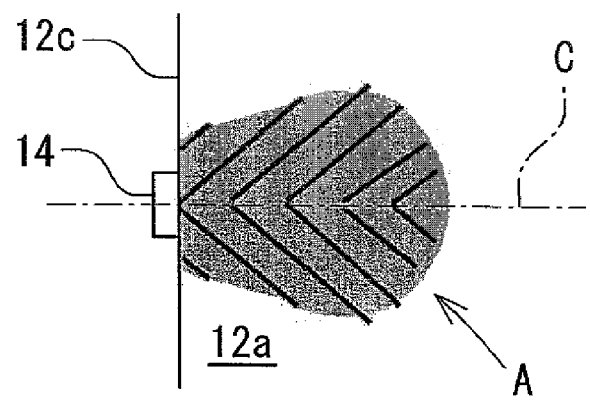
FIGS. 6B and 6C are plan views of optical elements of other embodiments.

In the example shown in FIG. 6B, the predetermined region A in which a plurality of the optical elements 34 are provided is set so as to form a rain drop shape in a plan view at a position in the forward direction of the LED 14.

Figure 6C:
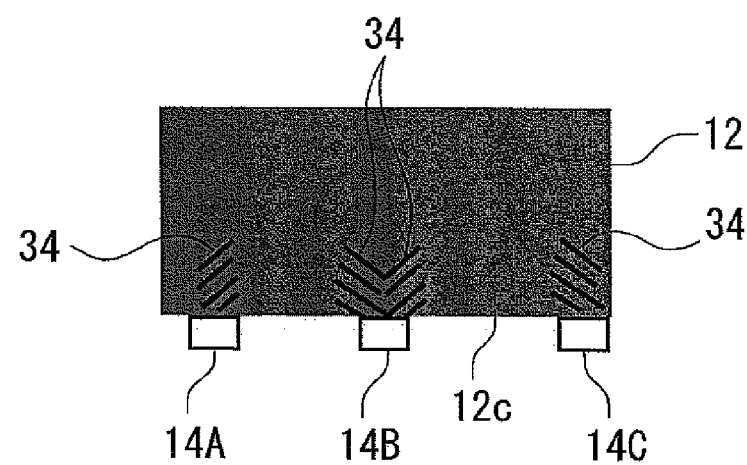

Further, in the example shown in FIG. 6C, among the three LEDs 14A, 14B, and 14C which are illustrated, the optical elements 34 positioned in the forward direction of the LEDs 14A and 14C on both sides, which do not have an adjacent LED 14 on one side thereof, are provided to extend toward only the other side at which the adjacent LED 14B exists.

In addition, although not illustrated, the plurality of optical elements 34 do not necessarily have to be parallel to each other. For example, the angles of the optical elements 34 relative to the optical axis C can be arranged randomly in consideration of the required light distribution and optical characteristics (in accordance with the embodiment of the brightness unevenness). Also, the present invention is not limited to an embodiment in which the optical elements 34 are formed in a straight line, and they can be formed to be, for example, curved or undulating.

The following operational effects can be achieved by the above-described embodiment of the present invention having the above-described structures.

The spread illuminating apparatus 10 according to this embodiment of the present invention includes the plurality of optical elements 34 which are formed linearly in the predetermined regions A adjacent to the incident light surface 12c of the LEDs 14 of the light guide plate 12, and each optical element 34 includes concave/convex shaped parts 36 in which three-dimensional convex parts $36_1$ to $36_n$ are repeatedly aligned in the longitudinal direction of the optical element 34. Therefore, as shown in FIG. 7A, light that enters from the incident light surface 12c of the light guide plate 12 includes not only light $L_0$ which is guided toward the forward direction in front but also light $L_1$ and light $L_2$ whose optical paths are modified by the concave/convex shaped parts 36 which constitute the optical elements 34 so as to be guided in the longitudinal direction of the optical elements 34 while progressing through the inside of the light guide plate 12. Further, in the course over which the lights $L_1$ and $L_2$ are guided and the region to which these lights are guided, these lights are suitably diffused in a state in which wasteful emission from the emitting surface 12a is inhibited. In other words, the optical elements 34 guide the lights $L_1$ and $L_2$ in the longitudinal direction of the optical elements 34, and thereby suitable diffusivity is also exhibited in the region in which the optical elements 34 are provided while controlling the directivity of the light.

Further, the optical elements 34 are disposed to extend forward from the front of each of the plurality of LEDs 14 toward the forward direction in front of an adjacent LED(s) 14. Thereby, light emitted from one LED 14 is guided while being suitably diffused toward the front direction of the adjacent LED(s) 14. Also, the recessed amount and/or protruding amount of the concave/convex shaped parts 36 that constitute the optical elements 34 are not constant, and thus the optical path of light progressing through the inside of the light guide plate 12 is modified randomly. Therefore, a diffusing effect of the lights $L_1$ and $L_2$ which are guided toward the front direction of the adjacent LED(s) 14 is efficiently exhibited. Further, by providing a plurality of optical elements 34, the above-described effects are achieved by each of the plurality of optical elements. The line indicated by DL in FIG. 7A schematically represents a boundary between a dead area and an effective area (the area which exhibits good light emission) of the emitting surface 12a.

The light distribution of a forward direction region $F_0$ in front of the LEDs 14 (the light distribution in a direction parallel to the incident light surface 12c) shown in FIG. 7A is illustrated in the left-side graph of FIG. 7B, and the light distribution of a forward direction region $F_1$ between the LEDs 14 shown in FIG. 7A is illustrated in the right-side graph of FIG. 7B. According to this embodiment, in the light distribution of the forward direction region $F_0$ in front of the LEDs 14, the light $L_2$ guided from an adjacent LED 14 is also added to the light $L_0$ guided toward the forward direction in front of the LED 14, and thus the light distribution can be expanded from the distribution shown by the solid line to the distribution shown by the dashed line in the left-side graph of FIG. 7B. Meanwhile, the light distribution of the forward direction region $F_1$ between the LEDs 14 shown in the right-side graph of FIG. 7B typically exhibits a bimodal distribution due to the contribution to light emission by the light $L_1$ from two LEDs 14. However, the brightness unevenness when diagonally viewing the spread illuminating apparatus 10 can be reduced because the light distribution of the forward direction region $F_0$ in front of the LEDs 14 and the light distribution of the forward direction region $F_1$ between the LEDs 14 approximate each other.

As a comparative example, FIGS. 7C and 7D illustrate views corresponding to FIGS. 7A and 7B of a conventional spread illuminating apparatus 10 that includes a light guide plate 12 which does not have the optical elements 34. In the light distribution of the forward direction region $F_0$ in front of the LEDs 14, the light $L_0$ guided toward the forward direction in front of the LEDs 14 mainly contributes to light emission. In contrast, the light distribution of the forward direction region $F_1$ between the LEDs 14 exhibits a bimodal distribution due to the contribution to light emission by the light $L_1$ from two LEDs 14. There is a considerable difference between the light distributions in the left-side graph and the right-side graph shown in FIG. 7D, i.e. between the light distribution of the forward direction region $F_0$ in front of the LEDs 14 and the light distribution of the forward direction region $F_1$ between the LEDs 14. Therefore, remarkable brightness unevenness occurs when diagonally viewing the spread illuminating apparatus 10.

Figure 8:
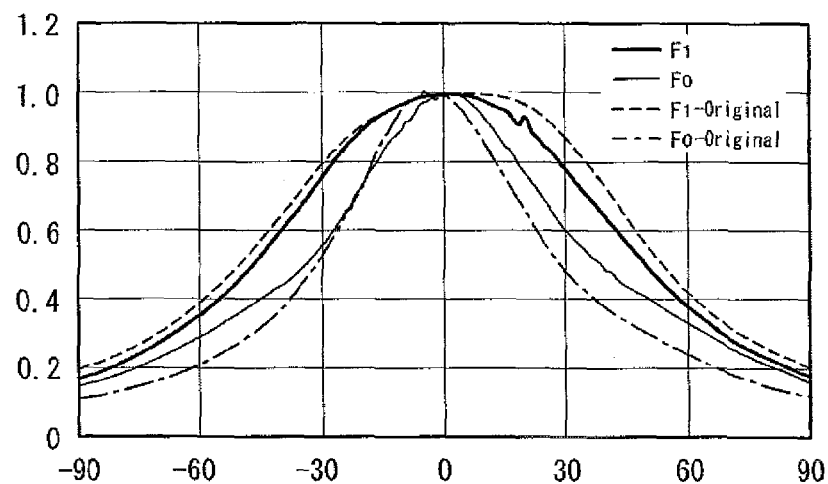
FIG. 8 is a graph in which the light distribution of the light guide plate according to the embodiment of the present invention is superposed onto the light distribution of a light guide plate that does not include optical elements.

In FIG. 8, the light distributions of FIGS. 7B and 7D are superposed on each other. Therein, it can be confirmed that the difference between the light distributions of $F_0$-original and $F_1$-original of the prior art is remarkable, whereas the difference between the light distributions of $F_0$ and $F_1$ according to the embodiment of the present invention is reduced.

Wasteful emission from the emitting surface 12a of light that has entered from the incident light surface 12c of the light guide plate 12 is inhibited by the linearly-formed optical elements 34 while the light is progressing through the inside of the light guide plate 12, and the light is guided in the longitudinal direction of the optical elements 34 which extend linearly. Thereby, the above-described effects are achieved.

Also, the plurality of optical elements 34 which are formed linearly are parallel to each other. Thereby, the directivity of light that is guided by each of the optical elements 34 is aligned in one direction, and the directivity of the light is effectively controlled.

The average value of the angles θ formed by the plurality of optical elements 34 with the perpendicular direction relative to the incident light surface 12c of the light guide plate 12 is 30° or more but less than 60°, and thereby the above-described effects are appropriately exhibited.

Also, the optical elements 34 are arranged having one endpoint thereof disposed on the optical axis C of the LED 14, and thereby the above-described effects are appropriately exhibited.

Further, the spread illuminating apparatus 10 includes the optical elements 34 that extend in mutually opposite directions in a plan view of the principal surfaces 12a and 12b, and thereby light emitted from one LED 14 is guided toward the front direction of the LEDs 14 adjacent on both sides of the one LED 14. Thereby, the above-described effects are achieved.

As shown in FIG. 6A, on the optical axis C of the LED 14 in a plan view of the principal surfaces 12a and 12b, the endpoints of optical elements 34 that extend in mutually opposite directions are arranged alternately along the optical axis C of the LED 14. Thereby, when guided toward the front direction of the LEDs 14 that are adjacent on both sides of the one LED 14, light emitted from the one LED 14 is efficiently and uniformly diffused toward the front direction of the LEDs 14 that are adjacent on both sides.

Compared to a case in which the endpoints of the optical elements 34 match on the optical axis C of the LED 14, the convex parts $36_1$ to $36_n$ that constitute the optical elements 34 do not overlap and thus the shape of the optical elements can be easily controlled. Considering the case in which a die is used to manufacture the light guide plate 12, the shapes of the grooves 34' do not overlap when forming the grooves 34' constituted by the concave parts 42 on the die by laser processing or the like, and thus the shapes can be easily controlled. In order to achieve these operational effects, the endpoints of optical elements 34 that extend in mutually opposite directions do not have to be arranged at equal intervals along the optical axis C of the LED 14, and in some cases, the intervals change regularly or change randomly.

The ratio of the outer diameter (the width in the short-dimensional direction of the optical elements) to the pitch (the pitch of adjacent convex parts $36_1$ to $36_n$ in the longitudinal direction of the optical elements 34) of the convex parts $36_1$ to $36_n$ that constitute the optical elements 34 is preferably 2 or more but less than 50. Thereby, the effect of controlling the directivity of light by the optical elements 34 and the effect of suitable diffusion are appropriately exhibited. As a result of keen research by the inventors, in order to achieve the above-described effects, it was confirmed that the outer diameter-to-pitch ratio is particularly preferably 7 or more in the above-mentioned numerical range. Also, the above-mentioned upper limit value is a value in the case of giving particular consideration to the precision when constituting the convex parts $36_1$ to $36_n$ (for example, the processing precision of the die in the case that shapes are transferred using a die), and is not an upper limit value for obtaining the above-described effects.

In addition, it was also confirmed by the inventors that the above-described effects are appropriately achieved by setting the contact angle of the optical elements 34 relative to the principal surfaces 12a and 12b to be 30° or more but less than 50°.

The concave parts and/or convex parts that constitute each concave/convex shaped part are dome-shaped, and a plurality of the concave parts and/or convex parts are continuously formed to be linear overall. Thereby, the above-described effects are appropriately exhibited.

The optical elements 34 according to this embodiment include concave/convex shaped parts 36 constituted by repeatedly aligning the dome-shaped convex parts $36_1$ to $36_n$ so that adjacent convex parts $36_1$ to $36_n$ partially overlap each other in the longitudinal direction of the optical elements 34. The recessed amount and/or protruding amount of the concave/convex shaped parts 36 are not constant due to the three-dimensional curved surfaces that constitute the convex parts $36_1$ to $36_n$.

In other words, in the concave/convex shaped parts 36, the convex parts $36_1$ to $36_n$ are repeatedly aligned in the longitudinal direction of the optical elements 34, and thus the cross-section shapes of the optical elements 34 are not constant and the area of the cross-section in a direction orthogonal to the longitudinal direction of the optical elements 34 repeatedly increases/decreases in the longitudinal direction without becoming zero. Alternatively, in the optical elements 34, the concave/convex shapes are repeated in the longitudinal direction over the surface layer thereof. Thereby, the shape of the optical elements 34 is not constant (the cross-section area does not decrease monotonically) and the optical elements 34 exhibit high-level anisotropy, and thus the above-described operational effects are effectively achieved.

In the present embodiment, an arc-shaped part obtained by cutting the convex parts $36_1$ to $36_n$ is included in the cross-section of the concave/convex shaped parts 36 that constitute the optical elements 34 along the longitudinal direction of the optical elements 34. Therefore, the inclination angle of the three-dimensional curved surfaces that constitute the convex parts $36_1$ to $36_n$ is not constant toward the longitudinal direction of the optical elements 34 and changes according to the arc shape. Thus, the optical path of light L that progresses through the inside of the light guide plate 12 is randomly modified toward different directions at different positions in the longitudinal direction of the optical elements 34, and a diffusing effect of the light L is efficiently exhibited.

Figure 5A:
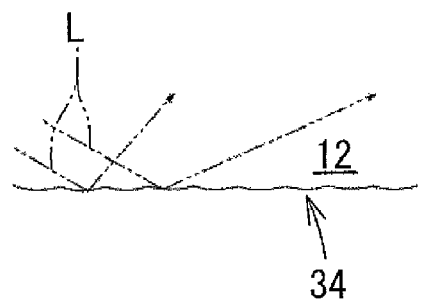
FIGS. 5A and 5C illustrate an effect of modifying an optical path of the optical elements according to the embodiment of the present invention.
Figure 5B:
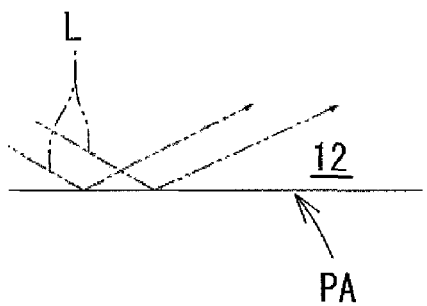
FIG. 5B illustrates an effect of modifying an optical path of optical elements having a V-shaped cross-section as a comparative embodiment of FIG. 5A.

FIGS. 5A and 5B schematically illustrate by the path (arrow marks) of the light L the optical path modifying effect of the optical elements 34 (whose side surfaces which are reflecting surfaces form curved surfaces) according to the present embodiment and the optical path modifying effect of optical elements PA (whose side surfaces which are reflecting surfaces form flat surfaces) having a simple V-shaped cross-section. As is clear upon comparing the two, the optical path of the light L of the optical elements 34 according to the present embodiment is effectively diffused as shown in FIG. 5A such that various points of brightness unevenness in the spread illuminating apparatus 10 are effectively eliminated.

In the present embodiment, the ridge lines 40 extending to connect one end side in the short-dimensional direction of the optical elements 34 to the other end side in an arc shape are included in the concave/convex shaped parts 36 in a plan view of the principal surfaces 12a and 12b (an arc-shaped part is included in the cross-section in the longitudinal direction). Therefore, the inclination angle in the short-dimensional direction is also not constant and changes according to the arc shape. Thus, a light diffusing effect is efficiently exhibited with respect to this point as well. Further, the inclination angle of the three-dimensional curved surface that constitutes each concave/convex shaped part 36 changes drastically crossing over the ridge lines 40. Therefore, the modification direction of the optical path of the light L that progresses through the inside of the light guide plate 12 clearly differs as the optical path crosses over the ridge lines 40, and thus a diffusing effect of the light L is efficiently exhibited.

In the present embodiment, the concave/convex shaped parts 36 are constituted as a continuous body by arranging adjacent convex parts $36_1$ to $36_n$ so that they partially overlap each other in a plan view of the principal surfaces 12a and 12b. Thereby, compared to a concave/convex shaped part in which adjacent convex parts $36_1$ to $36_n$ are formed to be arranged discretely, the inclination angle of the three-dimensional curved surface that constitutes the concave/convex shaped part can be appropriately set.

Figure 5C:
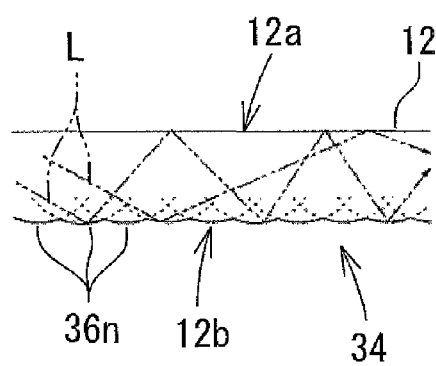
Figure 5D:
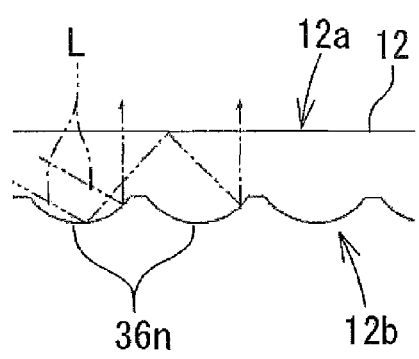
FIG. 5D illustrates an effect of modifying an optical path of optical elements formed such that adjacent convex parts are arranged discretely from each other as a comparative embodiment of FIG. 5C.

FIG. 5C illustrates an effect of modifying the optical path of the optical elements 34 according to the present embodiment, and FIG. 5D illustrates an effect of modifying the optical path of the optical elements formed such that adjacent convex parts $36_n$ are arranged discretely from each other as a comparative embodiment of FIG. 5C. If each convex part $36_n$ is constituted by a three-dimensional curved surface whose inclination angle changes regularly such as a dome shape as illustrated, the inclination angle of the three-dimensional curved surface (the angle of the line tangent to the principal surface) increases approaching the outer edge parts (refer to FIG. 5D).

As shown in FIG. 5C, if adjacent convex parts are arranged to partially overlap each other, the outer edge parts of the three-dimensional curved surface that constitutes each convex part are clipped off by adjacent convex parts such that they become linearly arranged. Since the outer edge parts which have a large inclination angle are clipped off, the effect of modifying the optical path of the light L that progresses through the inside of the light guide plate 12 is reduced, which allows for an increase in the amount of the light L that progresses farther from the incident light surface. Therefore, the amount of light emitted from regions of the emitting surface 12a of the light guide plate 12 that are farther from the incident light surface 12c increases, and thus a diffusing effect of the light L can be efficiently exhibited. Further, the occurrence of light emitted from dead areas is suppressed, and thus the efficiency of light utilization is enhanced (reductions in the efficiency of light utilization are suppressed).

In the present embodiment, the convex parts $36_n$ that constitute each concave/convex part 36 are dome-shaped, and a plurality of the convex parts $36_n$ are continuously formed to be linear overall. Thereby, the above-described effects are achieved.

In the present embodiment, in the case that the optical elements 34 are formed such that the protruding amount and/or recessed amount of the concave/convex shaped parts 36 decreases as the distance from the incident light surface 12c increases, the average width of the optical elements 34 that are formed to be linear overall decreases towards the distal tip thereof, and the average height (or depth) decreases towards the distal tip. Therefore, if each convex part $36_n$ is constituted by a three-dimensional curved surface whose inclination angle changes regularly such as a dome shape, the inclination angle of the three-dimensional curved surface that constitutes the convex part $36_n$ at the outer edge parts of the convex part $36_n$ becomes gentler as the protruding amount and/or recessed amount decreases. Thus, the effect of modifying the optical path of the light L that progresses through the inside of the light guide plate 12 is reduced toward the distal tip of the optical elements 34, and the perception of bright lines on the emitting surface 12a of the light guide plate 12 can be avoided.

The plurality of optical elements 34 can be configured to extend radially with the LEDs 14 as a base point, or the plurality of optical elements 34 can be configured to form an asymmetrical pattern shape relative to the optical axis of the LEDs 14. In addition, the optical elements 34 can be configured to meander or undulate in a plan view.

On the incident light surface 12c of the light guide plate 12, a so-called incident light prism (not illustrated) for controlling the orientation within the light guide plate 12 of light emitted from the LEDs 14 to reduce brightness unevenness can be provided. If an incident light prism is provided, for example, the plurality of optical elements 34 are preferably disposed according to the embodiment of the incident light prism to enable further reductions in brightness unevenness by the orientation that is controlled by the incident light prism and the synergistic effects of the optical elements 34.

If necessary, instead of configuring the optical elements 34 such that the protruding amount and/or recessed amount of the concave/convex shaped parts 36 decreases as the distance from the incident light surface 12c increases, they can be configured such that the average protruding amount and/or recessed amount of the concave/convex shaped parts 36 does not change across their entire length.

The full lengths of the optical elements 34 do not need to be the same, and the positions of the distal ends of the optical elements 34 can differ within a range of the predetermined regions A adjacent to the incident light surface 12c. The full lengths of the optical elements 34 can also be formed such that they are regularly or irregularly undulating. Further, the optical elements 34 can be multiply divided in the longitudinal direction.

In the present embodiment, an example in which the optical elements 34 are constituted by the convex parts $36_n$ was explained. However, the above-described operational effects can be appropriately achieved even if the convex parts $36_n$ are concave shaped or include a mixture of concave and convex shaped parts.

The pitch of the convex parts $36_n$ can be changed along the longitudinal direction of the optical elements 34, and can be changed between adjacent optical elements 34. Thereby, the optical path modifying effect of the optical elements 34 can be adjusted for each small region, so as to adapt to the necessary optical characteristics (embodiment of the brightness unevenness) with high dimensionality.

What is claimed is:

1. A spread illuminating apparatus comprising:
a plurality of light sources, and
a light guide plate including an incident light surface at which the plurality of light sources are disposed and a principal surface adjacent to the incident light surface,
wherein a plurality of optical elements formed linearly are provided in a predetermined region of the principal surface of the light guide plate adjacent to the incident light surface,
each of the plurality of optical elements has a concave/convex shaped part in which concave parts and/or convex parts are repeatedly aligned in a longitudinal direction of the optical elements, and
the plurality of optical elements are disposed so as to extend from the front of the plurality of light sources toward the forward direction in front of an adjacent light source(s).

2. The spread illuminating apparatus according to claim 1, wherein the plurality of optical elements include optical elements that are formed in a straight line.

3. The spread illuminating apparatus according to claim 2, wherein the plurality of optical elements that are formed in the straight line are parallel to each other.

4. The spread illuminating apparatus according to claim 1, wherein the plurality of optical elements are disposed such that an average value of angles formed by the plurality of optical elements with a perpendicular direction relative to the incident light surface of the light guide plate is 30° or more but less than 60°.

5. The spread illuminating apparatus according to claim 1, wherein the plurality of optical elements include optical elements having one endpoint thereof disposed on an optical axis of the light source.

6. The spread illuminating apparatus according to claim 5, comprising optical elements that extend in mutually opposite directions in a plan view of the principal surface,
wherein on the optical axis of the light source, endpoints of the optical elements that extend in mutually opposite directions are arranged alternately along the optical axis of the light source.

7. The spread illuminating apparatus according to claim 1, wherein the plurality of optical elements are disposed such that adjacent concave parts or convex parts partially overlap each other in a plan view of the principal surface.

8. The spread illuminating apparatus according to claim 7, wherein an outer diameter-to-pitch ratio of the concave parts and/or convex parts is 2 or more but less than 50.

9. The spread illuminating apparatus according to claim 1, wherein the concave parts and/or convex parts form a dome shape.

10. The spread illuminating apparatus according to claim 1, wherein a contact angle of the plurality of optical elements relative to the principal surface is 30° or more but less than 50°.

* * * * *